United States Patent [19]
Brown

[11] 3,947,803
[45] Mar. 30, 1976

[54] DIRECTION FINDING SYSTEM

[75] Inventor: Charles B. Brown, Kensington, Md.

[73] Assignee: The United States of America as represented by the Secretary of the Navy, Washington, D.C.

[22] Filed: May 12, 1971

[21] Appl. No.: 142,780

Related U.S. Application Data

[63] Continuation of Ser. No. 459,561, Sept. 30, 1954, abandoned.

[52] U.S. Cl........... 340/6 R; 340/16 R; 343/100 CL
[51] Int. Cl.² ........................................... G01S 3/80
[58] Field of Search..... 340/6 R, 16 R; 343/100 CL, 343/112 D

[56] References Cited
UNITED STATES PATENTS 2,166,991  7/1939  Guanella.................. 343/100 CL
2,349,370  5/1944  Orner........................... 340/16 R Primary Examiner—Richard A. Farley
Attorney, Agent, or Firm—R. S. Sciascia; J. A. Cooke

[57] ABSTRACT

An apparatus and method for determining the range and bearing of an object from a reference position. Sound energy emanating from the object and travelling through a water medium strikes spaced hydrophones located at the reference position. The signals produced in each hydrophone are correlated with the signals in each of the remaining hydrophones. The signals are correlated with a variable time delay between signals and the resulting maximum correlation output determines the range and bearing of the object.

1 Claim, 8 Drawing Figures

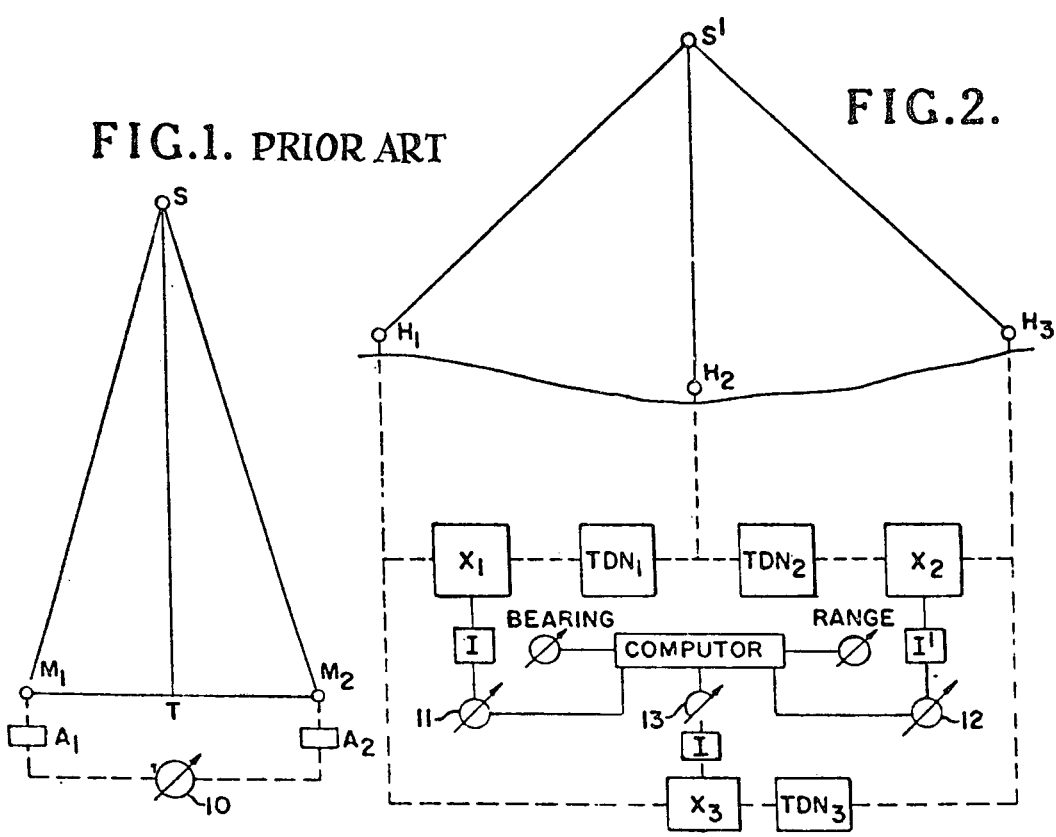
FIG.1. PRIOR ART
FIG.2.
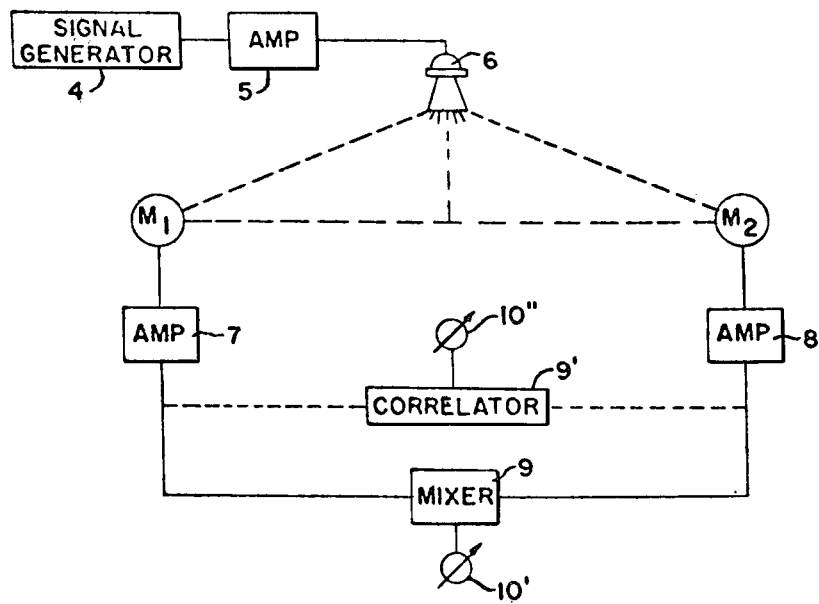
FIG.3.

FIG.4.
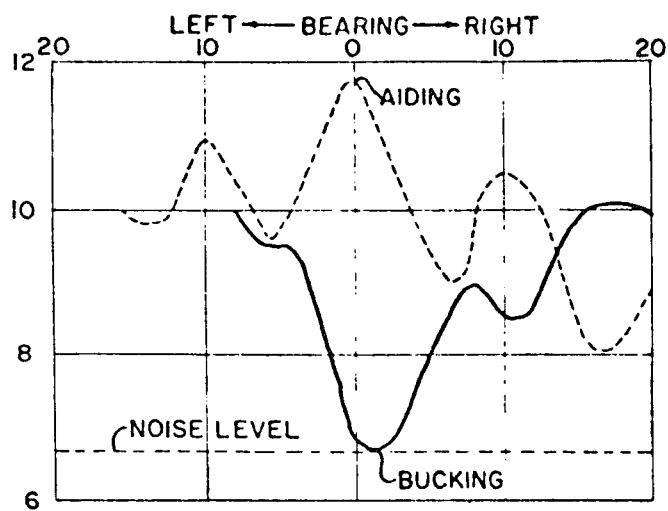
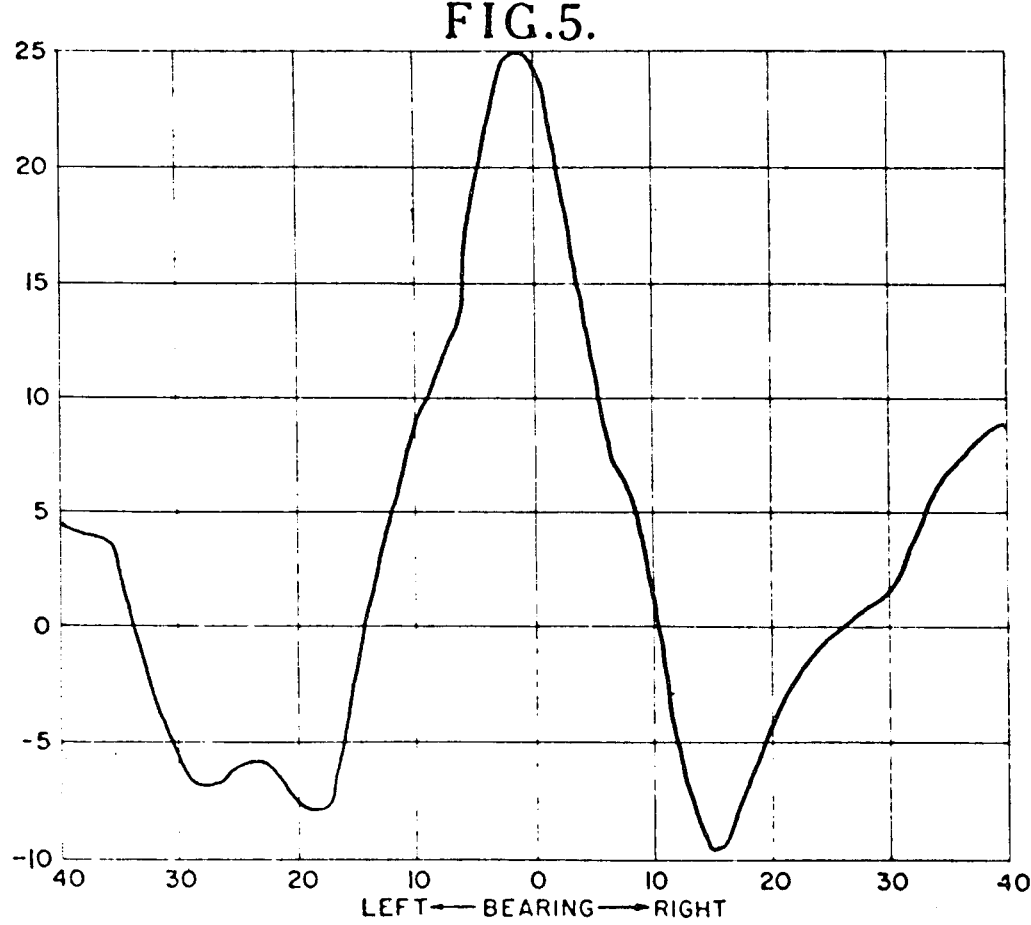
FIG.5.

DIRECTION FINDING SYSTEM

CROSS-REFERENCE TO RELATED APPLICATIONS

This application is a continuation of application Serial No. 459,561 filed September 30, 1954 and now abandoned.

BACKGROUND OF THE INVENTION

This invention relates to an improved direction-finding system and method utilizing detection by underwater listening, radio frequency or microwave detection in air or transduction of other electro-magnetic energy of a character permitting suitable time delay of signal intelligence.

Prior detection systems for listening have incorporated the comparison of nulling signals obtained from at least a pair of microphones of a detection array system by connection thereof either in series opposition to provide a subtractive output, or by connection thereof in a series aiding relationship to provide an additive comparison. The subtractive and additive outputs of the two arrangements may thereafter be compared to obtain the direction indication. These prior systems have presented certain shortcomings in that ambient noise intelligence which is present in the signals of each of the microphones, or hydrophones in the case of underwater placement thereof, tends to mask the nulling signal and the desired signal intelligence indication obtained by nulling is only valid to the extent that it shows a null down to the background level in the case of a subtractive system or shows the value of the nulling signal plus the background signal in an additive comparison system. Also these prior detection systems, whether they use a pair of individual microphones or a system utilizing an array of microphones combined in an overall or composite pair, tend to pick up interferring noises and indicate additional null points as the hydrophones of the array are swung or effectively swung about a central base point of ranging. This makes it difficult to discriminate between spurious and desired sound sources. Further difficulty is frequently encountered where attempts are made to analyze the information obtained by such nulling methods to determine if the primary signal source produced a certain null or whether the null was produced by wave lengths of other frequencies originating in the same general direction as the noise source of interest.

SUMMARY OF THE INVENTION

Accordingly, one object of the present invention is to extend the range and accuracy of listening devices, to improve the determination of bearing angle and/or range from the detection system and to eliminate the effects of interfering noise.

Another object of the invention to provide an improved direction finding and ranging method by listening in which interfering noises and sounds reaching the receiver are correlated in a manner to prevent obscuring of the direction or bearing determinations of desired signal intelligence.

Still another object of the invention resides in providing an improved direction finding system providing for bearing determination of a sound source to angles in the order of tenths of a degree.

Briefly, in accordance with one embodiment of the present invention these and other objects are attained by providing a system utilizing correlation of the sound or other signal intelligence presented to each microphone, or antenna as the case may be, of a detecting pattern system comprising a plurality of microphones or the like, and includes a system for multiplication of the transduced electrical signals from a first microphone for example by the electrical signals from at least a second thereof, and as will hereinafter become apparent, from a plurality of microphones. The output of the multiplier system is integrated for a predetermined period of time and indicated by suitable indicating devices to provide improved direction or bearing angle determinations and if desired, range indications of a higher order than systems heretofore or now in general use.

BRIEF DESCRIPTION OF THE DRAWINGS

A more complete understanding and many of the attendant advantages of this invention will be readily appreciated as the same becomes better understood by reference to the following detailed description when considered in connection with the accompanying drawings wherein:

FIG. 1 is a diagrammatic illustration of a sound detecting arrangement of prior systems;

FIG. 2 is a block diagram of an improved direction finding system for underwater sounds and directed to a preferred embodiment of the instant invention;

FIG. 3, is a diagrammatic illustration of a test setup in air by which the data for the curves of FIGS. 4 and 5 were derived;

FIG. 4 is a graphical representation of direction signal plotting derived from additive and subtractive nulling detector systems of FIG. 1;

FIG. 5 is a graph showing the plotting of a received and correlated direction indicative signal as derived from a system embodying the method of this invention as shown in FIG. 2;

DESCRIPTION OF THE PREFERRED EMBODIMENT

Figure 6:
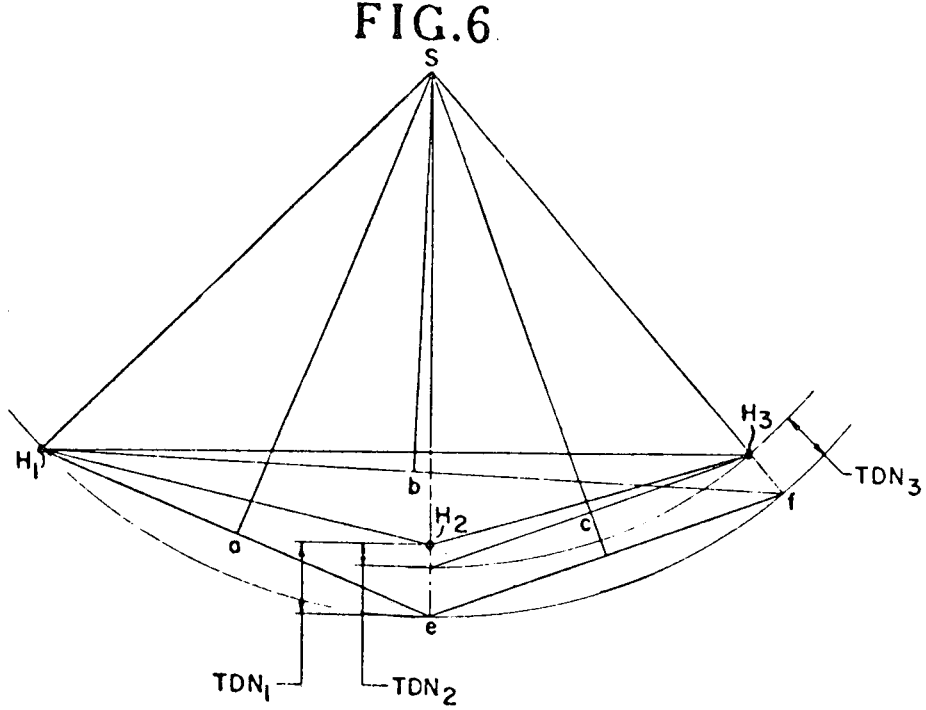
FIG. 6 is a diagram illustrating the geometry of the plottings for range and bearing of a sound source by the instant invention.

Referring now to FIG. 1 of the drawings there is shown a direction finding set up of prior art systems in which the location of the source of the underwater sound intelligence from a sound generator such as a torpedo propeller or the like is obtained at the instantaneous position indicated at S by the pair of hydrophone detectors $M_1$ and $M_2$ which are spaced along a base line in a well-known triangulation arrangement. The pair of microphones are arranged to be moved, or effectively swung as by the introduction of time delays in the respective signals, about a point T to set up an isosceles triangle relationship for determining the location and bearing of the sound source with respect to the perpendicular to point T of the system.

In such a system the signals from each of the hydrophones are amplified by suitable amplifiers $A_1$ and $A_2$ and mixed in a manner well-known in the art to provide either an additive output to an indicating device at 10 or a substractive output, or a combination of additive and subtractive arrangements for presentation to the indicating or recording device as the case may be. The indicating device may be any of suitable type of indicator or recorder such as a magnetic tape recorder of the Esterline Angus variety, or an output meter, or the signal may be presented to a cathode ray tube system for instantaneous visual observation. A pair of representative curves derived from such a system are shown in FIG. 4 wherein the solid line curve represents the signal derived from a subtractive mixing of the outputs of the two amplifiers and the broken line curve represents the plotting of signal level output from output meter indications from a signal additive mixing arrangement. It is pointed out that with either the subtractive system or the adding system the peak is broad and does not provide a high degree of accuracy as to the bearing or direction determinations of the sound source. Moreover with the combination of both the subtractive and the additive system curves of FIG. 4 the limitations still exist in both cases that the output includes the ambient noise level. It is thus deemed apparent that the response obtained by combining the additive and subtractive system outputs is inherently masked by noise signals.

It will become apparent upon reference to FIG. 5 that an improved sound detection and bearing indication is provided by the system of this invention herein it will be noted that the effects of noise in the signal have been substantially eliminated because of a much narrower peak of a nature giving a higher degree of bearing angle determination of the order of tenths of a degree indication. A test set up by which the curves of FIGS. 4 and 5 were determined is shown in FIG. 3 wherein an audio frequency signal generator is shown at 4 which signal is amplified at 5 and transduced in air at 6. This signal is picked up by the pair of microphones $M_1$ and $M_2$ which are spaced along the base line of the detection system. The output of each of these microphones is amplified at 7 and 8 respectively and in the case of curves of FIG. 4 are compared by subtractive and additive mixers at 9 and indicated by indicator 10'. With respect to the curve of FIG. 5 signals from $M_1$ and $M_2$, FIG. 3 are amplified at 7 and 8 and multiplied in the auto correlator 9' in a manner as shown by FIG. 2 as hereinafter setforth in greater detail and presented for visual display on a magnetic recording tape of a recorder or indicator at 10''. The actual apparatus set up for deriving the curve of FIG. 5 is somewhat more complex than is apparent from the showing in FIG. 3 and reference is now made to FIG. 2 for a more detailed description of an actual detection arrangement.

Referring now to FIG. 2 there is shown a source of sound signals at S' and a system of hydrophones at $H_1$, $H_2$ and $H_3$ with $H_1$ and $H_3$ being disposed in a mutually spaced relation with respect to $H_2$ for reasons as will hereinafter become more apparent as the description proceeds. The hydrophone $H_2$ which is for purposes of obtaining range of the sound source may be omitted if range to the target is not desired, while still maintaining a high degree of bearing and direction sensitivity. However, the system shown diagrammatically in FIG. 2 is a preferred embodiment of the instant invention. The signal from $S_1$ presented to hydrophone $H_1$ is multiplied by the time-delayed signal from $H_2$ after passage of the latter signal through the time delay network $TDN_1$. The multiplied combination of the signal received by the hydrophones $H_1$ and $H_2$ provides a correlated output signal at the multiplier $X_1$. This signal is then passed through the integrator I and displayed for visual observation or recording at an indicating device 11. In like manner the signal from $H_2$ is passed through a time delay network $TDN_2$ to be multiplied by the signal voltage from $H_3$. These signals are multiplied at $X_2$ and the output thereof is integrated at I' for subsequent presentation at 12. A further comparison is provided by comparing the signals from $H_1$ with a time-delayed signal voltage from $H_3$ as passed through the time delay network at $TDN_3$ and multiplied in $X_3$. The output of multiplier $X_3$ is integrated at integrator I'' and presented for visual recording at 13.

Referring now to FIG. 6 for the geometry of ranging and direction finding in a system of FIG. 2, wherein the following relationships of the system will become more apparent from a graphical presentation thereof; and with respect to which:

Distance = velocity in medium x Time
$V$ = velocity of sound in water
S represents the source of soond
$H_1$, $H_2$, and $H_3$ are the hydrophones of FIG. 2; and the time delay network effects are indicated as $TDN_1$, $TDN_2$, $TDN_3$.

$SH_1$ and $SH_2 + V \times TDN_1$ produces an isosceles triangle with bearing line Sa, $V \times TDN_1 = H2e$. $SH_3 + V \times TDN_3$ and $SH_1$ produces an isosceles triangle with bearing line Sb, $V \times TDN_3 = H3f$. $SH_2 + V \times TDN_2$ and $SH_3$ produces isoceles triangle with bearing line Sc.

These bearing lines pass through S giving range from $H_2$ of $SH_2$ or range from $H_1$ of $SH_1$ or range from $H_3$ of $SH_3$.

While the determination is shown here as a plotting board solution, the trigonometric computer indicated in block form at 14 of FIG. 2 functions to read out the bearing and range from any arbitrary position from $H_1$ to $H_3$ using parallax methods from the three time delay values $TDN_1$, $TDN_2$, and $TDN_3$ and the known surveyed positions of $H_1$, $H_2$ and $H_3$. The bearing indication is obtained at 14 and the range indication is presented at 15. The advantages of the instant system will be more apparent from a mathematical approach as hereinafter setforth.

A mathematical analysis of the relationship existing between the conventional listening systems and the instant system will be apparent from the relationships found in FIG. 1 wherein a sound source S is located by swinging the two hydrophones $M_1$, $M_2$ until the comparison device C indicates a null. If the output of the sound source is $f(t)$ where this represents a noise arising from the ship propulsion equipment aand propellers, the performance near balance can be expressed as:

$$E = f(t) - f(t \pm \tau)$$

Where E is the correlation signal voltage', $f(t)$ is the time function of the sound source, $\tau$, the time displacement equals $d \sin \phi$, $d$ = hydrophone spacing, $\phi$ = angular deviation from true bearing. For angles up to 10°, $\phi$ in radians may be taken equal to $\sin \phi$.

Using Taylor's expansion on $f(t + \tau)$ $$f(t + \tau) = f(t) + \tau f'(t) + \tau 2/2 f''(t)$$

for small values of $\tau$, $f(t + \tau) = f(t) + \tau f'(t)$; hence $E = f(t) - f(t) - \tau f'(t) = \tau f'(t)$ Since $\tau$ is proportion to $\phi$ for small angles, the quantity E observed is proportional to the deviation of the bearing angle observed from the true bearing angle, and proportional to the derivative of the instantaneous noise voltage. It is unfortunate that all other noise $E(t)$ reaching the hydrophones is modified only slightly by the comparison process, and provides only a slight dip in the curve $E(t) - E(t \pm \tau_1) + f(t) - f(t \pm \tau)$ which still tends to mask the null as shown by FIG. 4.

There is little to be gained by averaging since the noise $E(t)$ averages in approximately the same way as the signal $\tau f'(t)$. If the array is phased to produce an additive result as represented by $E = f(t) + f(t+\tau)$ no improvement is noticed.

Treating this by expansion $E = 2f(t) + \tau f'(t)$. Since $f(t)$ does not change for small values of $\tau$ the signal itself interfers with the observation of the change of bearing voltage E as well as all other noises not being ranged upon.

Figure 7:
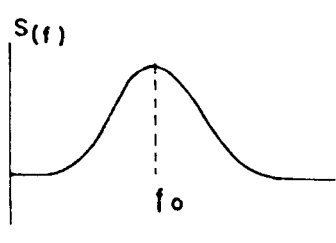
FIG. 7 is a characteristic curve of the power spectrum showing changes of $s(f)$ with frequency obtained by the instant system.
Figure 8:
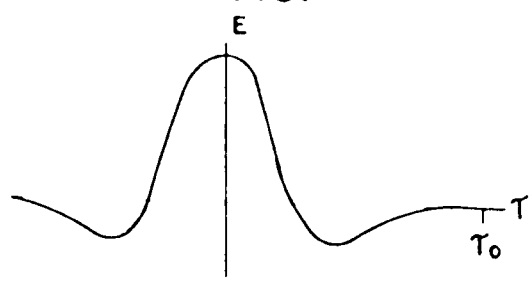
FIG. 8 is a typical characteristic curve of the voltage changes of the correlation signal $E$ with respect to $\tau$.

The solution, to which this invention relates, resides in the correlation of the hydrophone outputs. If the array is phased to produce through a multiplying circuit the function $$E = \frac{1}{2T} \int_{-T}^{+T} f(t)f(t \pm \tau)dt$$

the form of the function for small values of $\tau$ depends on the power spectrum of the noise. For example, if the power spectrum has the form $s(f) = Kf^2 e^{-f^2}$ and has the property of random phase relations between the frequency components then $E$ will have the form $+ 2e^{-\tau^2} -4\tau 2e^{-\tau^2}$. These two functions are plotted in FIGS. 7 and 8. The accuracy of bearing determination is now determined by the difficulty of locating the maximum value of E at $\tau = 0$. Since $\tau = d \sin \phi$, this can be controlled by making the spacing as large as practical. Noise is no longer a controlling factor since the function $E$ is zero for all values of $\tau > \tau_o$. It is assumed of course, that $T$, the integrating time is large enough so that $f(t)$ can be considered as equivalent to a stationary time series i.e., (that it is invariant in time transformation). A rough estimate indicates from 40 to 50db improvement in signal to noise ratio of this method over the previously described null balancing.

The test setup of FIG. 3 shown in dotted outline is a simplified variation for testing one section of FIG. 2, by which means the curve of FIG. 5 is obtained. The test setup is intended to be illustrative only, for obtaining the curves of FIG. 4 and FIG. 5. It is generally similar as to the block arrangements for the sound source and the placement of the microphones in air for obtaining the null curve tests and the auto correlation system tests of the instant invention with the exception that the block represented as 9 is the mixer of the null system and 9' in the dotted outline is the correlator of the improved system. In the null system the mixer 9 feeds the indicator 10' while the correlator 9' takes the form of the time delay circuit and multiplier of FIG. 2, the output of which is integrated when applied to an integrating circuit not specifically indicated on FIG. 3 and thereafter fed to a recording indicator at 10''. The time delay networks $TDN_1$, $TDN_2$, $TDN_3$ of FIG. 2 are utilized for the purpose of obtaining the equivalent to swinging the base line of the hydrophones about a midpoint on the base line when it is desired to obtain isosceles triangulation with respect to the pair of hydrophones.

It is to be noted that the system of FIG. 2 as arranged approaches a hyperbolic line of position finder with a sort of inverted Loran coordinate system rather than a more general triangulation system indicated by FIG. 3. Search is made by sweeping $\tau$) at a slow rate and hyperbolically triangulating to plot the position of all noise sounds within range.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A sound direction finding system for determining the location of a sound source comprising:

first, second and third sound transducers for converting sound signals into electrical signals, said first and said third sound transducers disposed in a mutually spaced relation with respect to said second sound transducer to form an isosceles triangle therewith:

a first variable time delay network for introducing a first predetermined variable time delay into the electrical output signal from said second sound transducer;

a second variable time delay network for introducing a second predetermined variable time delay into the electrical output signal from said second sound transducer;

a third variable time delay network for introducing a third predetermined variable time delay into the electrical output signal from said third sound transducer;

a first multiplier for multiplying the electrical output signal from said first sound transducer and the output signal from said first variable time delay network;

a second multiplier for multiplying the electrical output signal from said third sound transducer and the output signal from said second variable time delay network;

a third multiplier for multiplying the electrical output signal from said first sound transducer and the output signal from said third variable time delay network;

a first integrator for integrating the output of said first multiplier with respect to time;

a second integrator for integrating the output of said second multiplier with respect to time;

a third integrator for integrating the output of said third multiplier with respect to time;

a first visual indicator coupled to the output of said first integrator for visually displaying the output signal from said first integrator;

a second visual indicator coupled to the output of said second integrator for visually displaying the output signal from said second integrator;

a third visual indicator coupled to the output of said third integrator for visually displaying the output signal from said third integrator; and a trigonometric computer coupled to said first, said second, and said third visual indicators for computing the range and bearing of said sound source.

\* \* \* \* \*